(12) United States Patent
Size, Jr.

(10) Patent No.: US 11,168,729 B2
(45) Date of Patent: Nov. 9, 2021

(54) MULTI-PIECE ANTI-VIBRATION LOCKING FASTENER

(71) Applicant: Earl Allen Size, Jr., Rochester Hills, MI (US)

(72) Inventor: Earl Allen Size, Jr., Rochester Hills, MI (US)

( * ) Notice: Subject to any disclaimer, the term of this patent is extended or adjusted under 35 U.S.C. 154(b) by 305 days.

(21) Appl. No.: 16/507,104

(22) Filed: Jul. 10, 2019

(65) Prior Publication Data

US 2020/0291982 A1 Sep. 17, 2020

Related U.S. Application Data

(60) Provisional application No. 62/816,964, filed on Mar. 12, 2019.

(51) Int. Cl.
*F16B 39/00* (2006.01)
*F16B 39/02* (2006.01)
*F16B 41/00* (2006.01)

(52) U.S. Cl.
CPC .......... *F16B 39/028* (2013.01); *F16B 41/002* (2013.01)

(58) Field of Classification Search
CPC .............................. F16B 39/028; F16B 41/002
USPC ........ 411/214, 215, 222, 223, 243, 244, 546
See application file for complete search history.

(56) References Cited

U.S. PATENT DOCUMENTS

| | | | |
|---|---|---|---|
| 885,544 A * | 4/1908 | Summons | |
| 893,081 A * | 7/1908 | Kunan | |
| 932,395 A * | 8/1909 | Kenney | |
| 1,138,574 A * | 5/1915 | King | F16B 39/16 411/243 |
| 1,357,331 A * | 11/1920 | Le Fauve | F16B 39/08 411/228 |
| 1,399,191 A * | 12/1921 | Antonio | F16B 39/282 411/222 |
| 2,956,293 A | 10/1960 | McKay | |
| 3,222,977 A | 12/1965 | Vaughn | |

(Continued)

FOREIGN PATENT DOCUMENTS

| | | |
|---|---|---|
| EP | 0178787 A2 | 4/1986 |
| EP | 0634583 A1 | 1/1995 |

(Continued)

OTHER PUBLICATIONS

International Search Report and Written Opinion issued by the Korean Intellectual Property Office as International Searching Authority for Application PCT/US2020/013335 dated May 15, 2020 (9 pages).

*Primary Examiner* — Gary W Estremsky
(74) *Attorney, Agent, or Firm* — Dinsmore & Shohl LLP

(57) ABSTRACT

A three-piece locking fastener including an interiorly threaded intermediate component open at opposite ends. A first screw having a first exterior thread pattern rotationally inter-engages with the interior threads of the intermediate component when installed through a first selected one of the opposite ends, the first screw having a hollow shaft exhibiting a further plurality of interior threads matching a direction of the first thread pattern. A second screw has a second exterior thread pattern opposite the first pattern and, upon being installed within the other selected one of the opposite ends, rotationally inter-engages the interior threads of the first screw, so that loosening of either of the first and second screws being prevented by their counter-threaded orientation.

10 Claims, 15 Drawing Sheets

(56) References Cited

U.S. PATENT DOCUMENTS

| | | | | |
|---|---|---|---|---|
| 4,043,239 A * | 8/1977 | DeFusco | ................ | F16B 37/00 |
| | | | | 411/337 |
| 4,253,509 A * | 3/1981 | Collet | ................... | F16B 41/005 |
| | | | | 411/214 |
| 5,314,279 A | 5/1994 | Ewing | | |
| 5,391,032 A * | 2/1995 | Vassalotti | ............... | F16B 39/12 |
| | | | | 411/198 |
| 5,544,991 A * | 8/1996 | Richardson | ............ | F16B 39/12 |
| | | | | 411/237 |
| 5,562,379 A | 10/1996 | Rausch et al. | | |
| 5,855,463 A * | 1/1999 | Newby | ................... | F16B 39/18 |
| | | | | 411/244 |
| 6,676,874 B1 | 1/2004 | Muller | | |
| 6,789,993 B2 * | 9/2004 | Ozawa | ................. | F16B 5/0233 |
| | | | | 411/432 |
| 7,857,567 B2 * | 12/2010 | Iwata | ................... | F16B 5/0233 |
| | | | | 411/546 |
| 8,113,754 B2 * | 2/2012 | Dahl | ...................... | F16B 39/02 |
| | | | | 411/215 |
| 8,267,630 B2 * | 9/2012 | Moon | ...................... | F16B 5/02 |
| | | | | 411/338 |
| 8,398,349 B2 * | 3/2013 | Jackson | .................. | F16B 39/08 |
| | | | | 411/215 |
| 8,402,605 B2 | 3/2013 | Courtin et al. | | |
| 2005/0025607 A1 * | 2/2005 | Guantonio | ............. | F16B 39/12 |
| | | | | 411/222 |
| 2008/0056809 A1 * | 3/2008 | Kielczewski | ............ | F16M 7/00 |
| | | | | 403/118 |
| 2017/0021478 A1 | 1/2017 | Junkers et al. | | |
| 2019/0003513 A1 | 1/2019 | Junkers et al. | | |

FOREIGN PATENT DOCUMENTS

| | | |
|---|---|---|
| JP | 07-004418 A | 1/1995 |
| JP | 08-232932 A | 9/1996 |
| JP | 3137118 U | 11/2007 |
| JP | 2009-204153 A | 9/2009 |
| WO | 2015054722 A1 | 4/2015 |

\* cited by examiner

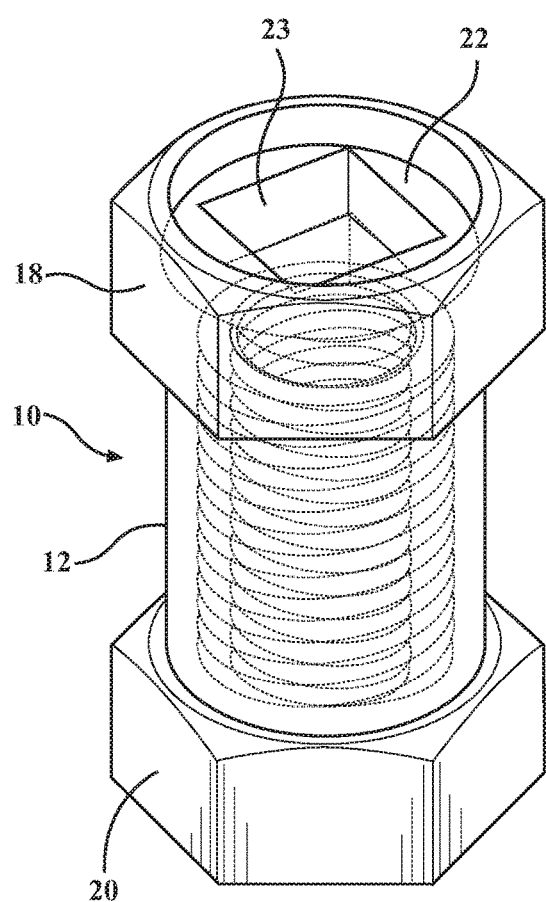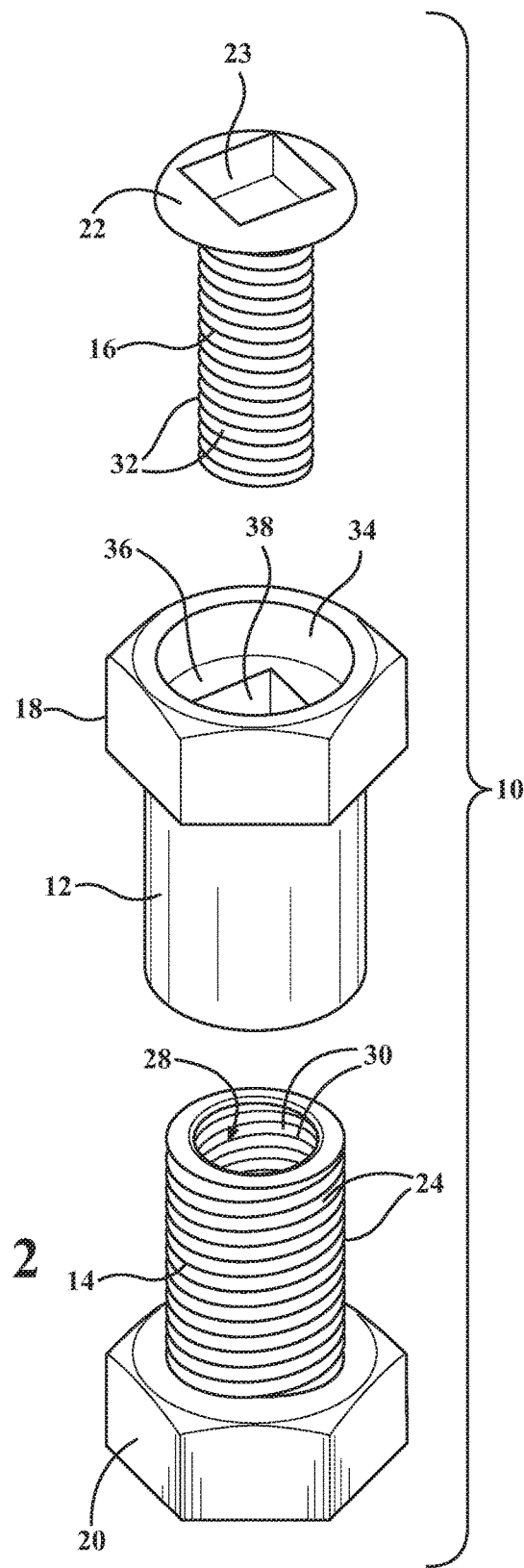
FIG. 1
FIG. 2

MULTI-PIECE ANTI-VIBRATION LOCKING FASTENER

CROSS-REFERENCE TO RELATED APPLICATIONS

The present application claims the priority of U.S. Ser. No. 62/816,964 filed Mar. 12, 2019.

FIELD OF THE INVENTION

The present invention relates generally to locking fasteners. More specifically, the present invention discloses a three piece locking fastener including an intermediate component which is interiorly threaded and open at opposite ends for receiving and first and second opposing directed and threaded screws. The first screw is exteriorly threaded for engaging with the threads of the intermediate component. The first screw also includes a hollow shaft which, upon being installed within a first end of the intermediate component, subsequently receives in a counter-rotatatively threaded fashion the second threaded screw, with loosening of either the opposing and inter-seating end screws being prevented via their counter-threaded orientations.

BACKGROUND OF THE INVENTION

The prior art is documented with examples of fasteners, such as which are configured in an attempt to prevent loosening when employed in dynamic environments. A first and most basic example of this is the conventional threaded bolt fastener with attachable and interiorly threaded nut. A spring washer can either be integrated into the nut or separately provided.

Other examples include the locking threaded fastener of Ewing, U.S. Pat. No. 5,314,279, which teaches a locking threaded fastener of the wedge-action type with threaded and threadless nut members with wedge elements therebetween for wedging the nut members apart when the threaded nut member is turned in the loosening direction. In a two-piece nut, the threadless nut member has a flat inner surface for engaging the workpiece and the wedge elements have engaging surfaces with a coefficient of friction therebetween which is less than that between the flat inner surface and the workpiece surface. In a three-piece nut, a third nut member, in the form of a washer, is provided with a flat inner surface for engaging the workpiece. The wedge elements have engaging surfaces with a coefficient of friction less than that between the third nut member and the threadless nut member which, in turn, is less than that between the third nut member in the workpiece.

U.S. Pat. No. 5,562,379, to Rausch et al., teaches a vibration resistant fastener having a pin and a collar. The pin is threaded or peripherally grooved. At a central location, the major diameter of the thread or groove is reduced to a diameter which is still larger than its minor diameter. A collar is threaded or swaged on to the pin and collar material is pressed into an open region that was formed by the reduction of the major diameter, to form a thread lock.

SUMMARY OF THE PRESENT INVENTION

The present invention discloses a three piece locking fastener including an interiorly threaded intermediate component open at opposite ends. A first screw having a first exterior thread pattern rotationally inter-engages with the interior threads of the intermediate component when installed through a first selected one of the opposite ends, the first screw having a hollow shaft exhibiting a further plurality of interior threads matching a direction of the first thread pattern. A second screw has a second exterior thread pattern opposite the first pattern and, upon being installed within the other selected one of the opposite ends, rotationally inter-engages the interior threads of the first screw, so that loosening of either of the first and second screws being prevented by their counter-threaded orientation.

Additional features include each of the intermediate component and a selected one of the first and second screws having an enlarged head with a number of interconnected sides having a polygonal shape. The second screw further includes a curved and enlarged diameter head.

Other features include a tool bit engageable recess profile incorporated into the enlarged head. The intermediate component further includes an end proximate undercut recess for receiving the enlarged head of the second fastener. A recessed ledge is configured within the undercut recess of the intermediate component for seating an underside of the enlarged head of the second fastener in an installed position. A polygonal inner perimeter can be configured in the undercut recess for communicating an extending stem of the second fastener within the intermediate component and in engagement with the hollow threaded interior of the previously installed first fastener.

Yet additional features include the intermediate component and the first and second fasteners each further including a rigid material not limited to a steel or heavy duty nylon construction. The first and second layers have aligning apertures through which a stem portion of the intermediate component extends, with the enlarged polygonal shaped heads established by the intermediate component and the selected one of the first and second screws compressing against opposite edge surfaces of the layers adjoining the apertures.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an assembled and partially transparent view of a three piece fastener according to a first variant of the present invention;

FIG. 2 is an exploded view depicting the three piece fastener of FIG. 1 with the intermediate component and first (bottom) hollow screw and second (top solid screw);

DETAILED DESCRIPTION OF THE PREFERRED EMBODIMENTS

Figure 4:
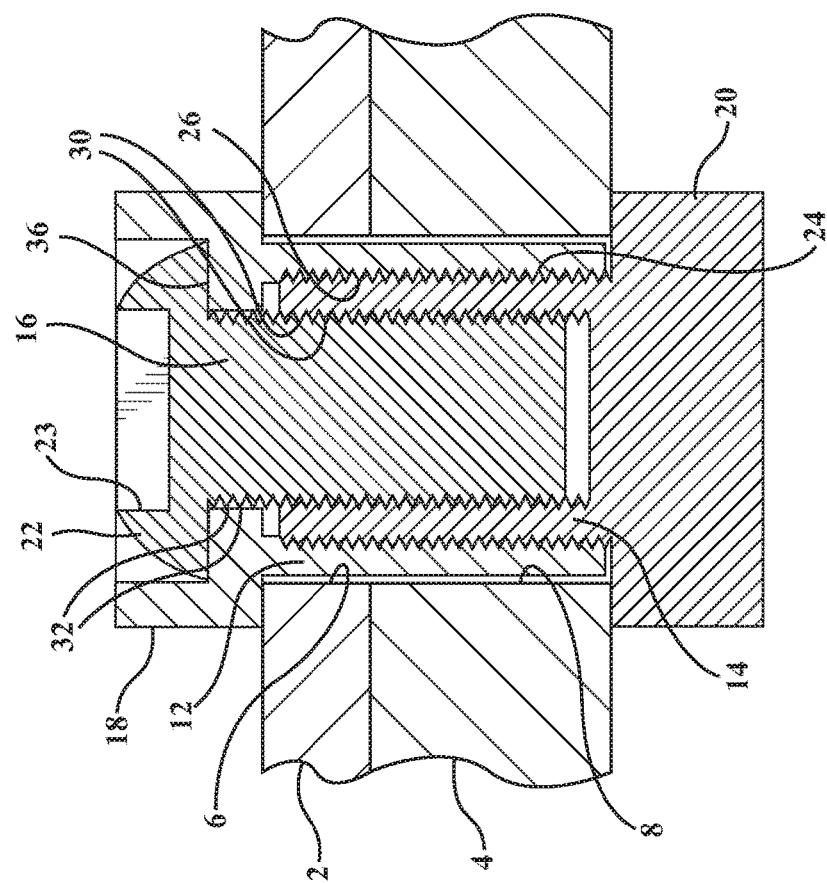
FIG. 4 is an axial cutaway view depicting the assembly of FIG. 1.

With reference to the following illustrations, the present invention discloses a three piece locking fastener for use such as in dynamic environments in which vibrations and other effects are in play. This can include without limitation such operating environments as skate blade fasteners for compressively attaching a first blade layer to a second layer, such as further including a support plate or the like formed with the bottom of the skate. Other applications include the three piece fastener being integrated into a wheel to hub attachment interface, such as for a vehicle.

As will be further detailed in reference to each of the alternate variants, the fastener assembly includes, at a minimum, an intermediate component which is interiorly threaded and open at opposite ends for receiving and first and second threaded screws. The first screw is exteriorly threaded for engaging with the threads of the intermediate component. The first screw includes a hollow shaft which, upon being installed within a first end of the intermediate component, subsequently receives in a counter-rotatatively threaded fashion a second threaded screw, with loosening of the opposing end screws being prevented via their counter-threaded orientation.

Referring initially to FIG. 1, generally depicted at 10 is an assembled and partially transparent view of a three piece fastener according to a first variant of the present invention. As further shown in the exploded view of FIG. 2, the three piece fastener includes intermediate component 12 and first (bottom) hollow screw 14 and second (top) solid screw 16. Consistent with all of the variants, the intermediate component 12 and first 14 and second 16 fasteners can be constructed of any rigid material not limited to steel, carbon steel or any durable composite (e.g. nylon or polymer) material. As further understood, the screws 14 and 16 are also commonly termed as "threaded bolts" however can include any other suitable configuration for inter-engaging with the intermediate component 12 in the manner described herein.

Figure 3:
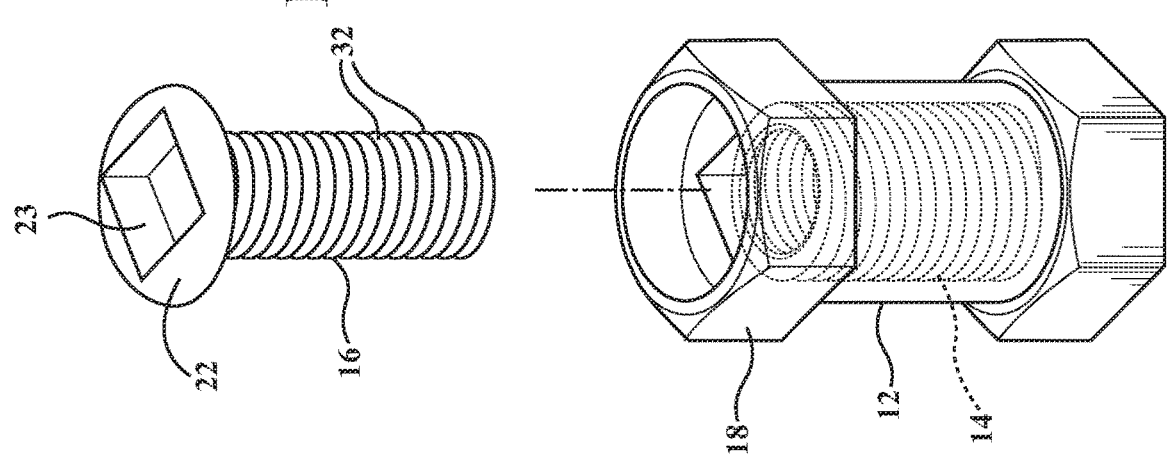
FIG. 3 is a partially exploded view of FIG. 1 and illustrating the lower or first hollowed screw engaged within the lower open and interiorly threaded end of the intermediate component prior to engagement of the upper or second solid screw.
Figure 5:
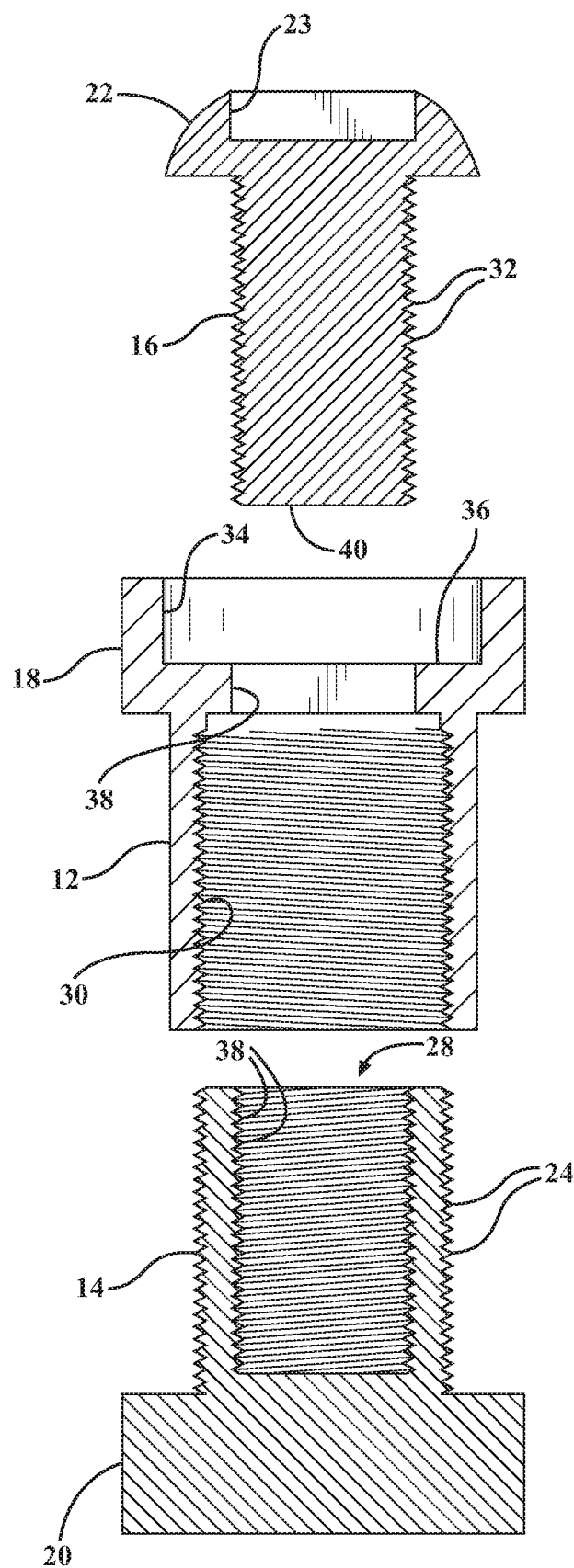
FIG. 5 is an exploded axial cutaway view corresponding to FIG. 2.

FIG. 3 is a partially exploded view of FIG. 1 and illustrating the lower or first hollowed screw 14 engaged within the lower open and interiorly threaded end of the intermediate component 12 prior to engagement of the upper or second solid screw 16. FIG. 4 is an axial cutaway view depicting the assembly of FIG. 1 and further showing first 2 and second 4 layers, each having aligning apertures depicted by inner perimeter surfaces 6 and 8, respectively, and through which a stem portion (again at 12) of the intermediate component extends. FIG. 5 further provides is an exploded axial cutaway view corresponding to FIG. 2 of the three piece fastener.

As previously described, the layers 2 and 4 are generally represented and can include any configuration or application not limited in one potential application to such as an attachment fastener for a skate blade to a flange, bracket or other support surface. In a further application, the layers 2 can correspond to an inner rim or wheel supporting a tire in attachment to a wheel hub. In each instance, the present invention serves to provide a durable fastener arrangement which resists loosening in response to vibrations and the like, such as which can be typical of dynamic operating environments.

The intermediate component includes an enlarged polygonal shaped head, such as which is depicted as a hex head configuration, see at 18, which is shown proximate its upper open end. At least one of the selected screws 14/16 (or bolt threads) likewise include an enlarged hex head which is depicted in FIG. 1 by hex head 20 associated with the lower or first bolt 14. Without limitation, the hex head can be substituted by any other circular or other type of fastening tool, such including but not limited to a multi-sided polygonal shape head having any of a triangular, square, pentagonal or other shape exhibiting a number of interconnected sides, it also being envisioned that the polygonal shaped enlarged heads can be reconfigured in other shapes consistent with the use of any tightening or loosening tool.

As also shown, the upper or second screw 16 includes a curved and enlarged diameter head 22. A tool bit engageable recess (see square profile 23) is formed in the enlarged head 22 to facilitate engagement by a tool bit (not shown) for securing the second (top) screw 16 following pre-threaded engagement of the exterior threads (at 24) of the lower screw 14 within the interior threads (at 26) of the intermediate component 12.

As further shown, the first screw 12 includes a hollow shaft (see generally at 28 in FIG. 2) exhibiting a further plurality of interior threads (further at 30) matching a direction of the first thread pattern 24. In comparison, the second screw 16 exhibits a second exterior thread pattern 32 opposite said first pattern and upon being installed within the other selected one of the opposite ends (depicted as the upper end of the intermediate component 12 in FIGS. 1-5), results in rotationally inter-engaging of the thread pattern 32 with the opposing interior thread pattern 30 of the first screw 14, with loosening of either of the first 14 and second 16 screws being prevented by their counter-threaded orientation.

Additional features include the intermediate component 12 exhibiting an end proximate undercut recess, see annular inner rim surface 34 communicated with undercut ledge 36 in FIG. 2, this for receiving and seating the enlarged head 22 of the second fastener 16 in the manner best further shown in FIG. 5. A polygonal inner perimeter (see at 38) configured in the undercut recess for communicating the solid extending stem (at 40 in FIG. 5) of the second fastener within the intermediate component 12 and into engagement with the hollow threaded interior 28 of the previously installed first fastener 14. The fasteners provided can again include, without limitation, any cross sectional shape not limited to circular or other configuration.

Figure 6:
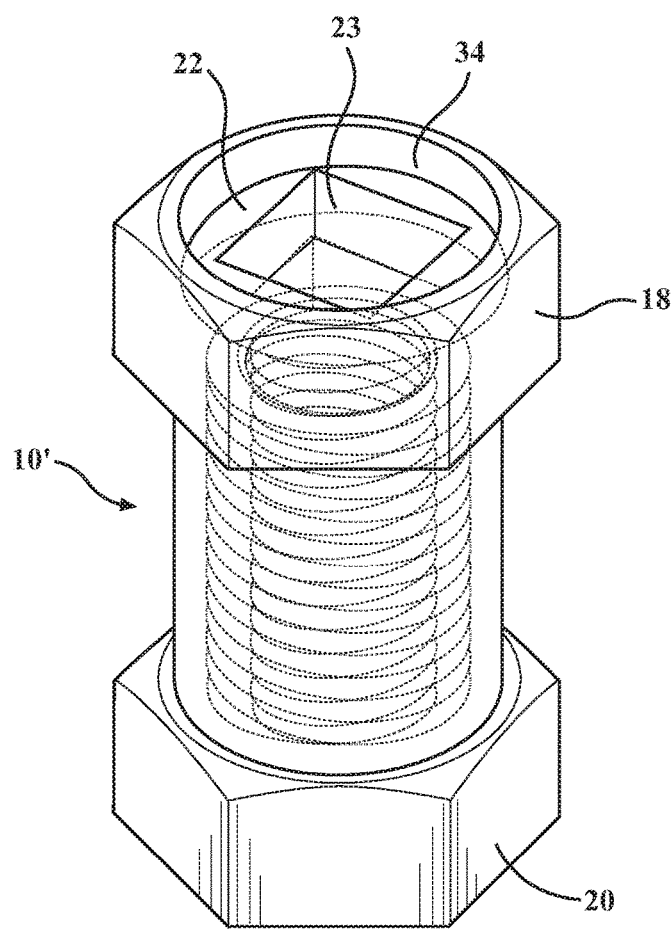
FIG. 6 is an assembled and partially transparent view of a three piece fastener as substantially shown in FIG. 1 with the direction of the first and second screw threads being reversed.
Figure 7:
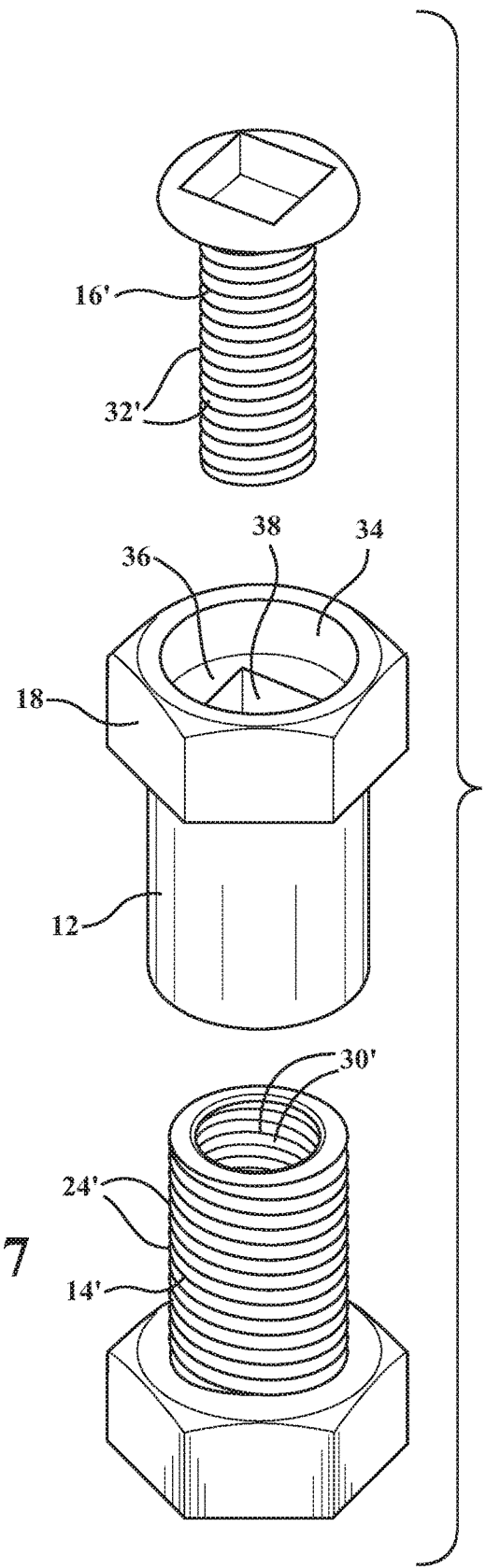
FIG. 7 is an exploded view depicting the three piece fastener of FIG. 6, similar to that previously shown in FIG. 2 and again with the intermediate component and first (bottom) hollow screw and second (top solid screw) with reversed thread patterns.

FIG. 6 is an assembled and partially transparent view of the three piece fastener as substantially shown in FIG. 1, and further depicted at 10' with the direction of the first and second screw threads being reversed as referenced by threads 24' of the first fastener, at 14' as further shown in FIG. 7, arranged in a reversed directional pattern from those depicted at 32' for second fastener 16', as also shown in FIG. 7. FIG. 7 is an exploded view depicting the three piece fastener of FIG. 6, similar to that previously shown in FIG. 2 and again with the intermediate component 12', first (bottom) hollow screw 14' and second (top solid screw) 16' with the reversed thread patterns 24' and 32'. An interior threaded pattern 30' of the intermediate component 12' (corresponding to that previously shown at 30 in FIG. 4) is likewise reversed to match that of the exterior threads 24'. Additionally, and for purposes of the present description, the reference to screw thread direction can also include the terms first/second, left/right or first and second opposing interchangeably and without limitation.

FIGS. 8-12 correspond to FIGS. 1-5 in the presentation of a three piece fastener according to a second variant of the present invention. For the purpose of clarity of description, additional figure descriptions for each of second variant of FIGS. 8-12 (and related sub-variant FIGS. 13-14), as well as the third variant of FIGS. 15-19 (and related sub-variant of FIGS. 20-21) will be limited to pointing out differences from that previously illustrated and described in the first embodiment. Similar features will remain as previously described or illustrated.

Figure 8:
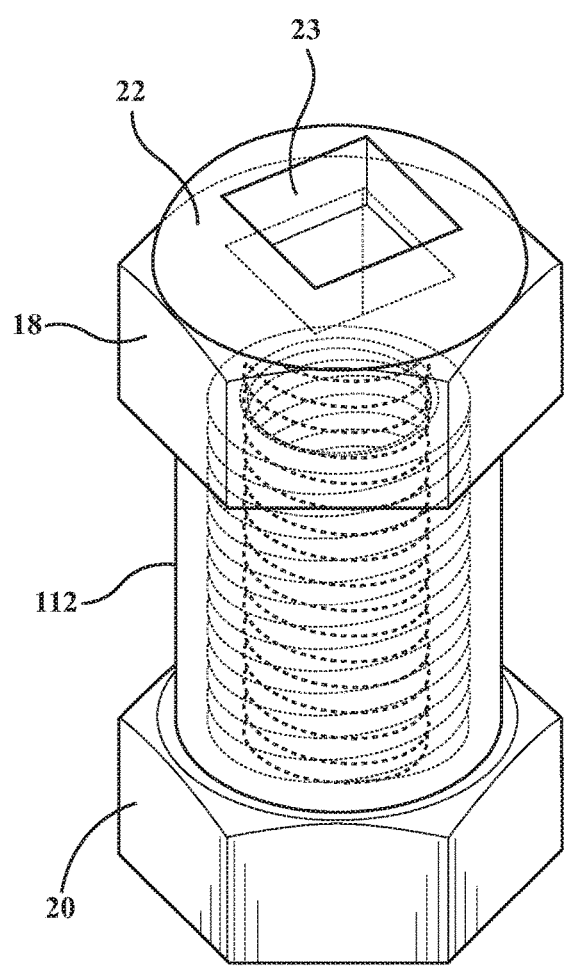
FIG. 8 is an assembled and partially transparent view of a three piece fastener according to a second variant of the present invention.
Figure 9:
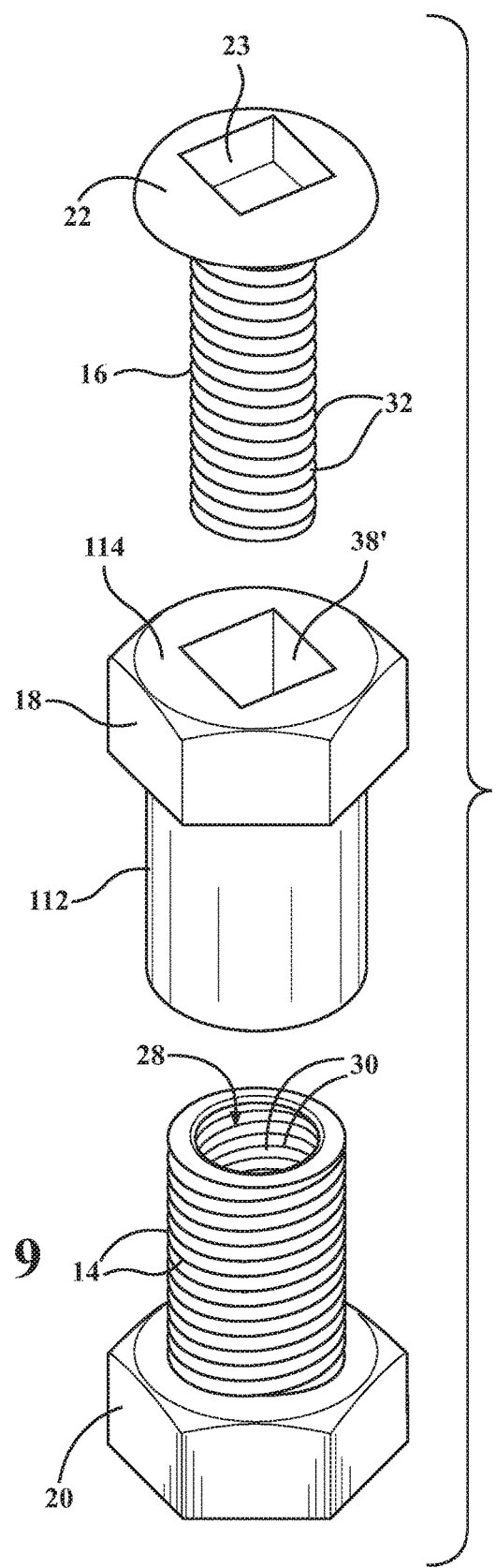
FIG. 9 is an exploded view depicting the three piece fastener of FIG. 8 exhibiting an alternately configured intermediate component with a non-recessed upper end in comparison to that shown in FIG. 1, in combination with a first (bottom) hollow screw and second (top solid screw) exhibiting reverse thread directions.

FIG. 8 is an assembled and partially transparent view of the three piece fastener according to a second variant of the present invention. FIG. 9 is an exploded view depicting the three piece fastener of FIG. 8 and, in differentiation from that shown in FIG. 1, exhibiting an alternately configured intermediate component 112 with a non-recessed upper end surface 114, this depicted in comparison to that shown in FIG. 1, in combination with the first (bottom) hollow screw 14 and second (top) solid screw 16 as previously described and exhibiting the reversed thread directions.

Figure 11:
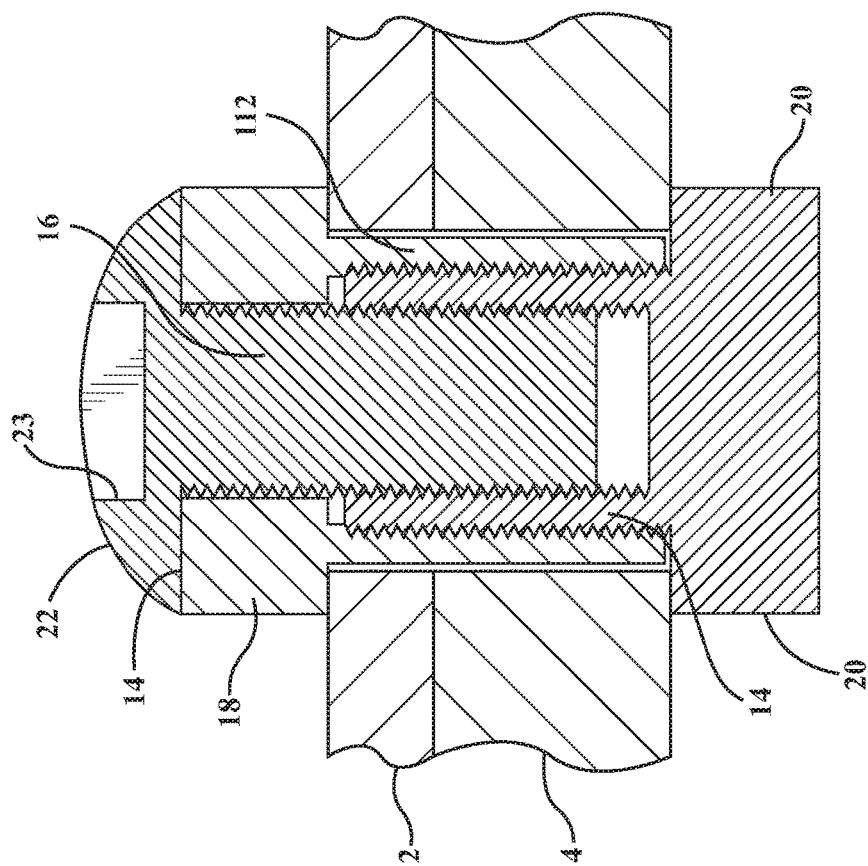
FIG. 11 is an axial cutaway view of the depicting the assembly of FIG. 8.
Figure 10:
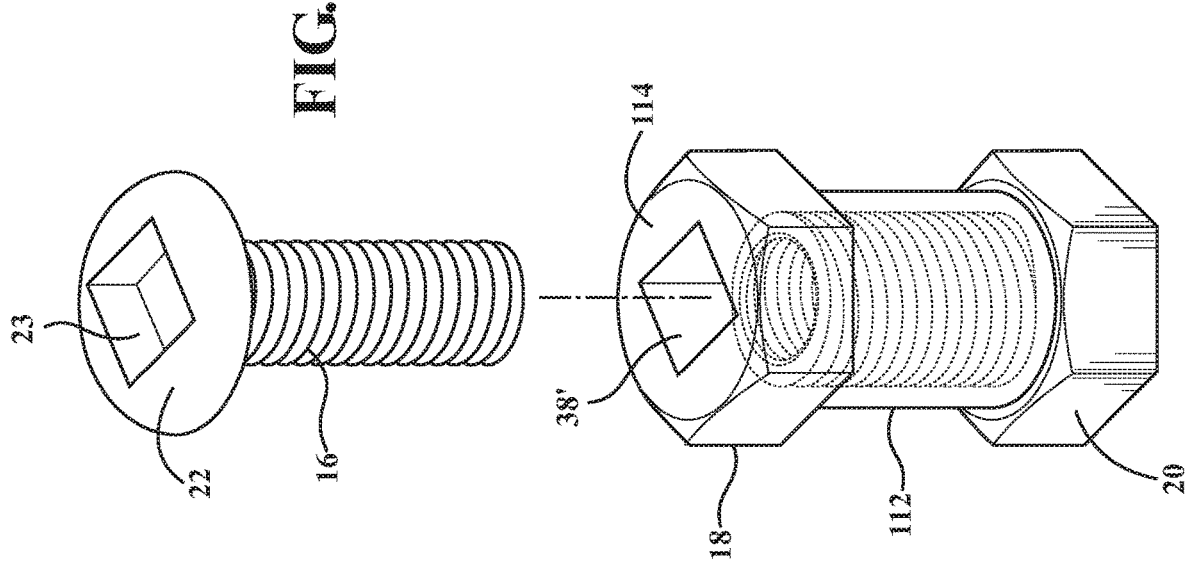
FIG. 10 is a partially exploded view of FIG. 9 and illustrating the lower or first hollowed screw engaged within the lower open and interiorly threaded end of the intermediate component prior to engagement of the upper or second solid screw.

FIG. 10 is a partially exploded view of FIG. 9 and illustrating the lower or first hollowed screw engaged within the lower open and interiorly threaded end of the intermediate component prior to engagement of the upper or second solid screw. FIG. 11 is an axial cutaway view of the depicting the assembly of FIG. 8 and in which the domed or arcuate profile 22 of the upper second screw 16 projects above the upper surface ledge 14 of the intermediate component 112 (and as opposed to being recess seated within the recess profile depicted at the upper end of the intermediate component 12 of FIG. 1 with the underside of the enlarged screw head of the second screw supported upon the undercut ledge 32 in FIG. 1).

Figure 12:
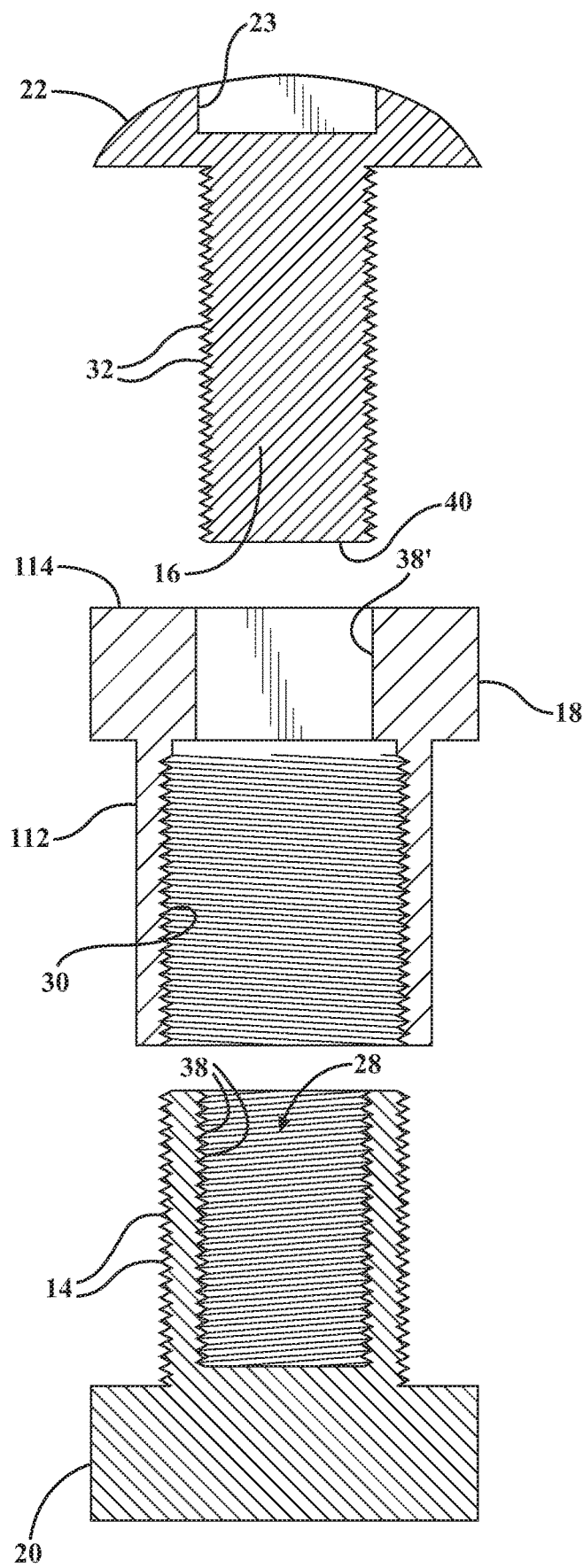
FIG. 12 is an exploded axial cutaway view corresponding to FIG. 9.
Figure 13:
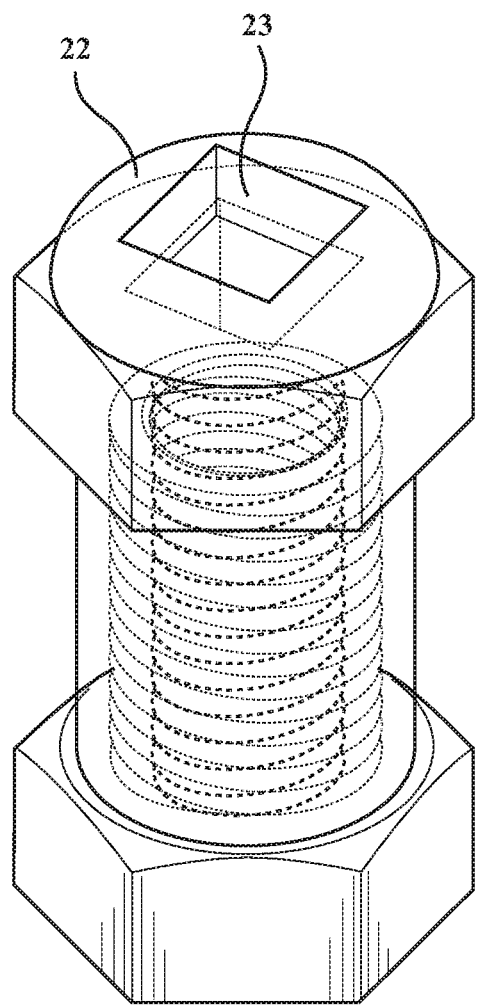
FIG. 13 is an assembled and partially transparent view of a three piece fastener as substantially shown in FIG. 6 with the direction of the first and second screw threads being reversed.
Figure 14:
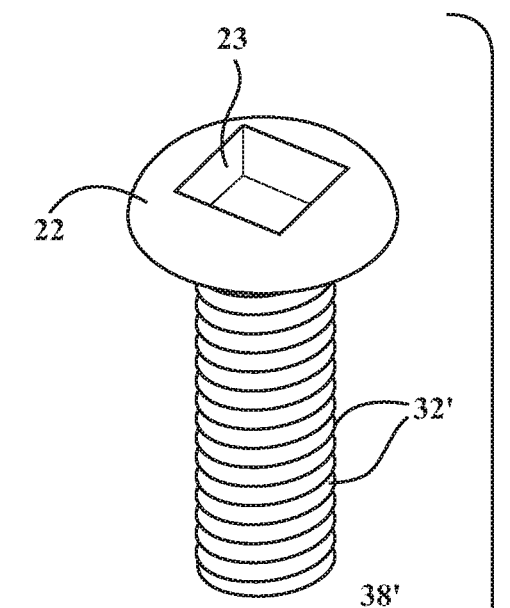
FIG. 14 is an exploded view depicting the three piece fastener of FIG. 9, again with the intermediate component and first (bottom) hollow screw and second (top solid screw) and reverse thread patterns exhibited on the top and bottom screws.
Figure 14:
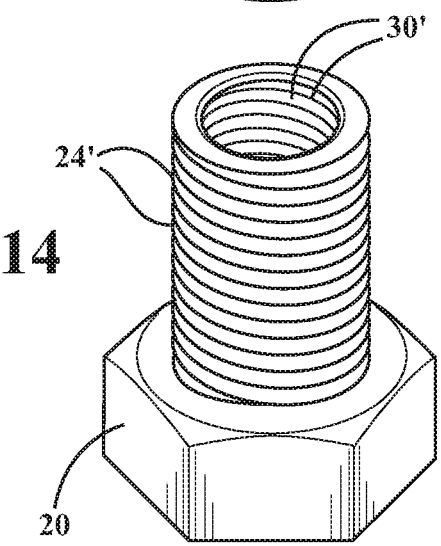

FIG. 12 is an exploded axial cutaway view corresponding to FIG. 9, with FIG. 13 depicting is an assembled and partially transparent view of a three-piece fastener as substantially shown in FIG. 8 with the direction of the first and second screw threads being reversed. A square perimeter opening 38' is referenced in the intermediate component 112 which corresponds to that shown at 38 in FIGS. 2 and 5, however is relocated more proximate the upper surface 114 of the intermediate component 112. As with the first embodiment, the dimensions of the reduced dimension square profile enable inserting passage there-through of the threaded stem or shaft 40 of the upper screw 16 (see also again FIG. 11). FIG. 14 is an exploded view depicting the three piece fastener of FIG. 9, again with the intermediate component 112 and first (bottom) hollow screw and second (top solid screw) and reverse thread patterns (see also FIGS. 6-7) exhibited on the top and bottom screws and in the same manner previously described.

Figure 15:
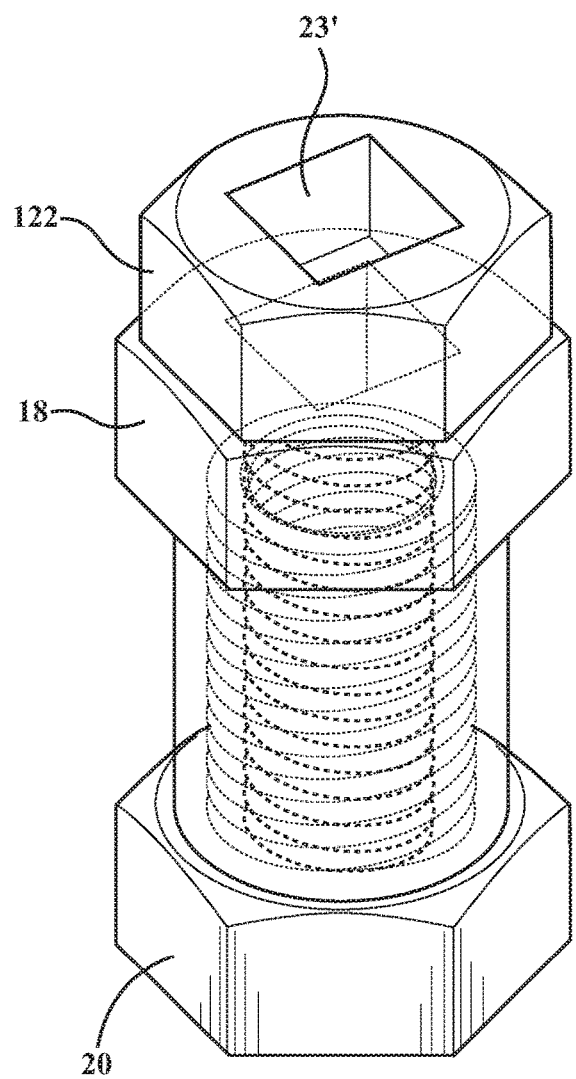
FIG. 15 is an illustration similar to previous FIGS. 1 and 8 of an assembled and partially transparent view of a three piece fastener according to a third variant of the present invention.
Figure 15:
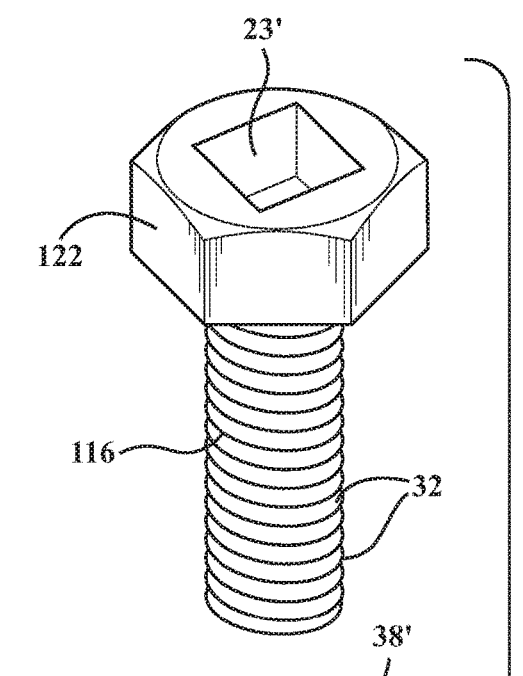
Figure 15:
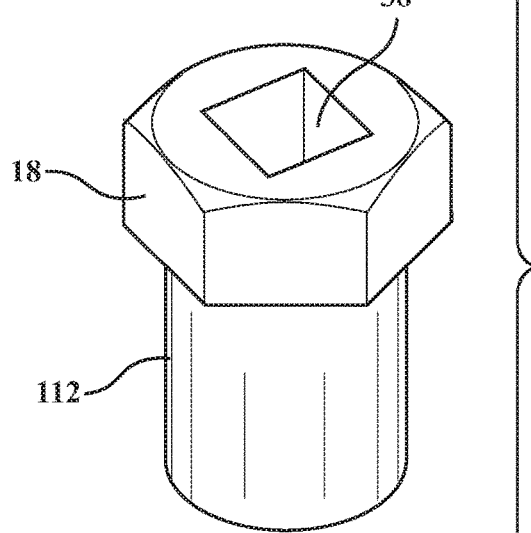
Figure 16:
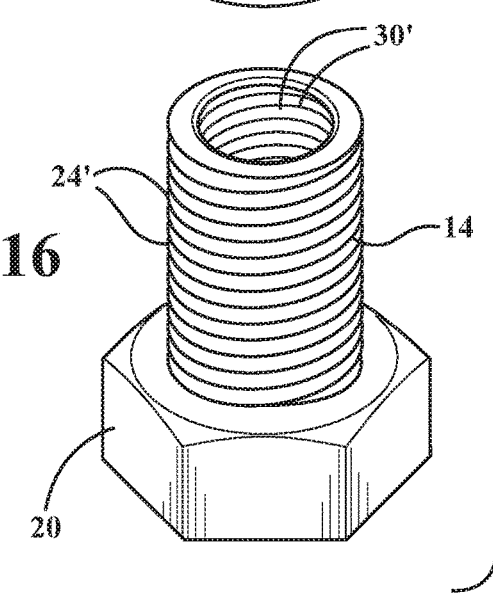
FIG. 16 is an exploded view depicting the three piece fastener of FIG. 15 with the intermediate component and first (bottom) hollow screw and second (top solid screw), the second top screw being alternately configured from that shown in FIG. 9.

FIG. 15 is an illustration similar to previous FIGS. 1 and 8 of an assembled and partially transparent view of a three-piece fastener according to a third variant of the present invention. FIG. 16 is an exploded view depicting the three-piece fastener of FIG. 15 with the intermediate component 112 and first (bottom) hollow screw 14 as depicted in FIG. 9, the second (top) solid screw being alternately configured from that shown at 16 in FIG. 9, and as further shown at 116 in FIG. 16. In particular, the domed head 22 of the second screw 116 is reconfigured in this variant as a hex head 122 with a flat upper surface within which is configured the tool bit engaging square recess pattern 23' reconfigured within the hex head 122.

Figure 18:
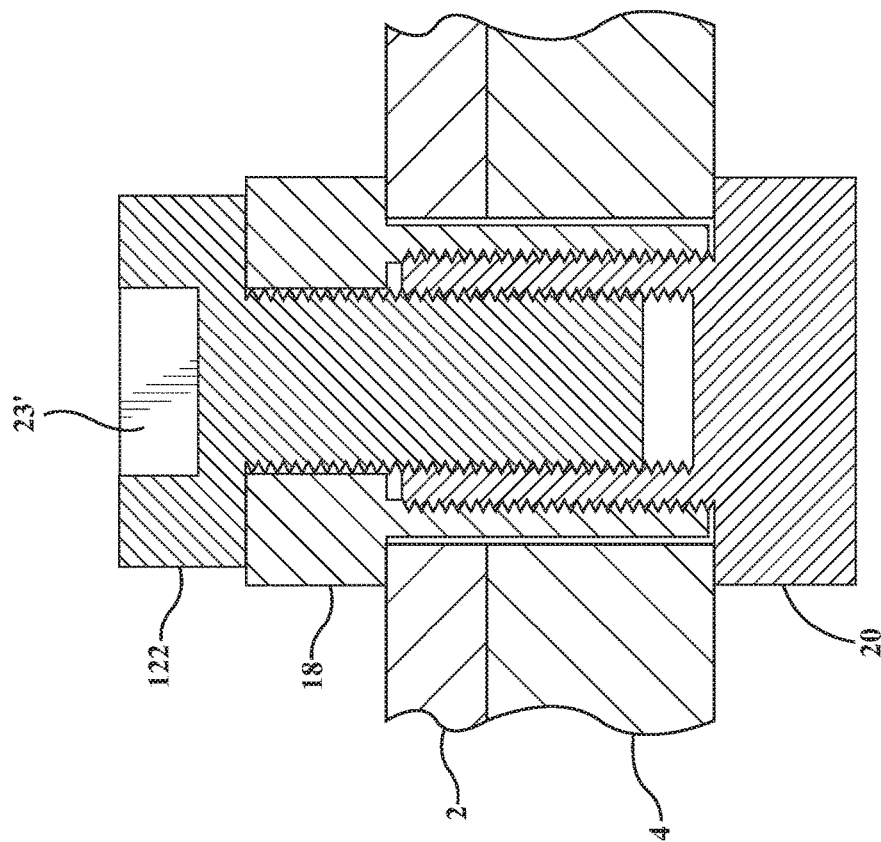
FIG. 18 is an axial cutaway view depicting the assembly of FIG. 15.
Figure 17:
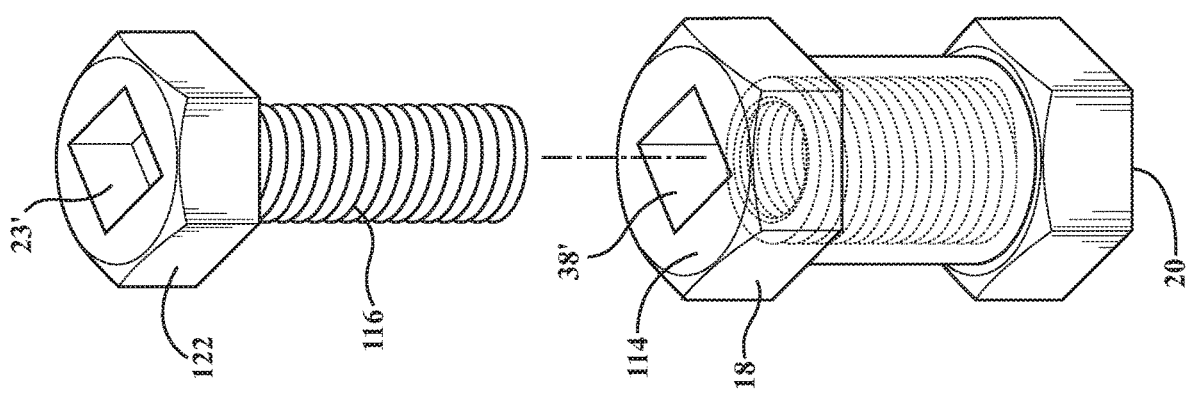
FIG. 17 is a partially exploded view of FIG. 15 and illustrating the lower or first hollowed screw engaged within the lower open and interiorly threaded end of the intermediate component prior to engagement of the upper or second solid screw.
Figure 19:
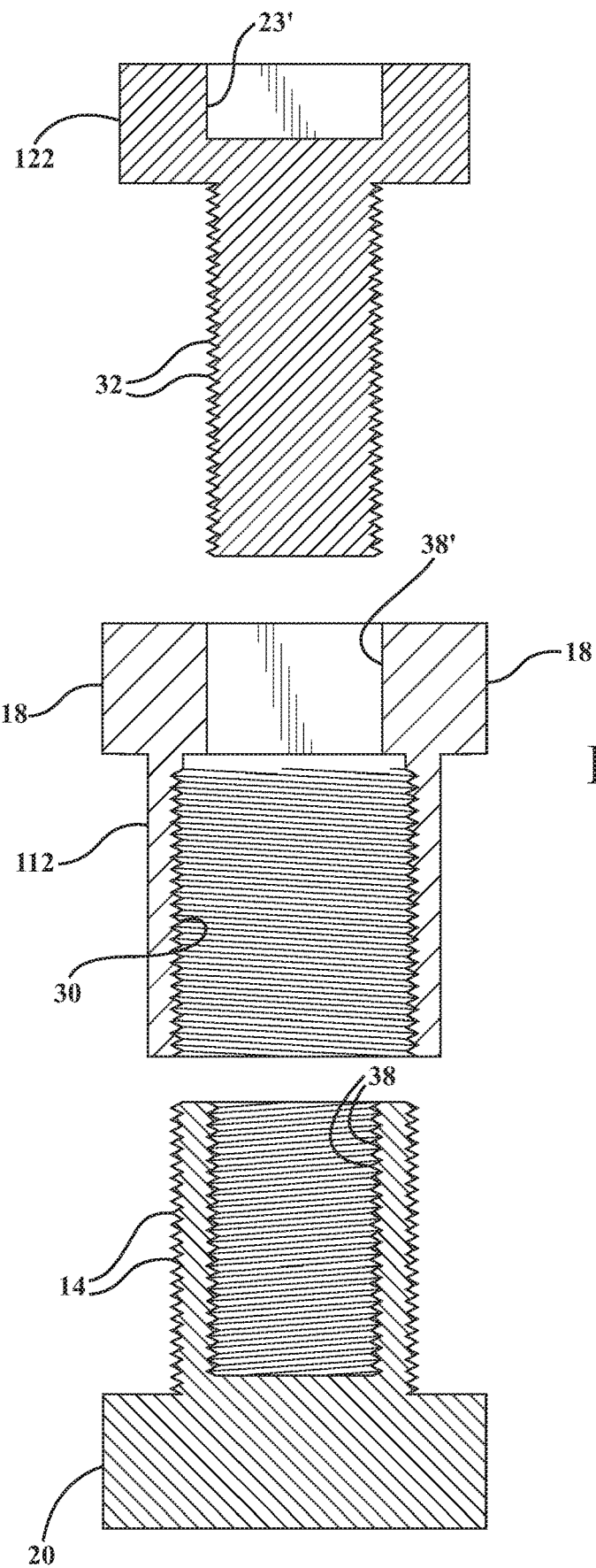
FIG. 19 is an exploded axial cutaway view corresponding to FIG. 16.

FIG. 17 is a partially exploded view of FIG. 15 and illustrating the lower or first hollowed screw 14 engaged within the lower open and interiorly threaded end of the intermediate component 112 prior to engagement of the upper or second solid hex head screw 122. FIG. 18 is an axial cutaway view of the depicting the assembly of FIG. 15, with FIG. 19 providing an exploded axial cutaway view corresponding to FIG. 16.

Figure 20:
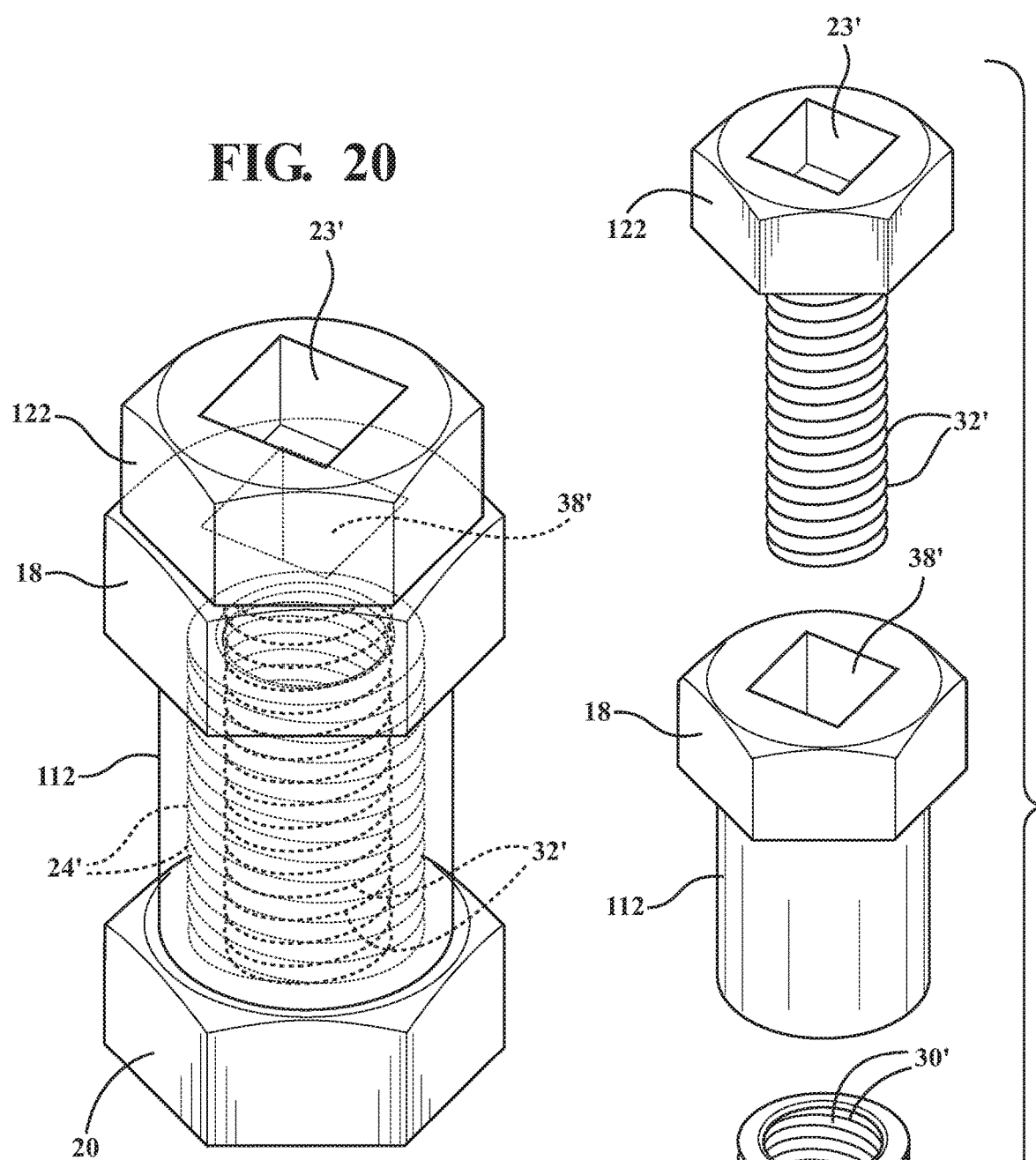
FIG. 20 is an assembled and partially transparent view of a three piece fastener as substantially shown in FIG. 15 with the direction of the first and second screw threads being reversed.
Figure 21:
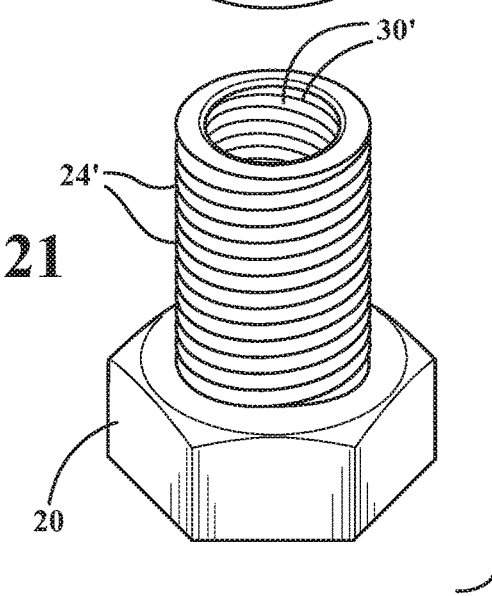
FIG. 21 is an exploded view depicting the three piece fastener of FIG. 20, similar to that previously shown in FIG. 16 and again with the intermediate component and first (bottom) hollow screw and second (top solid screw) with reversed thread patterns.

FIG. 20 is an assembled and partially transparent view of a three piece fastener as substantially shown in FIG. 15 with the direction of the first and second screw threads being reversed, this further depicted in the exploded view of FIG. 21 with reversed thread patterns as previously shown in corresponding FIG. 7 (first variant) and FIG. 14 (second variant).

Figure 22:
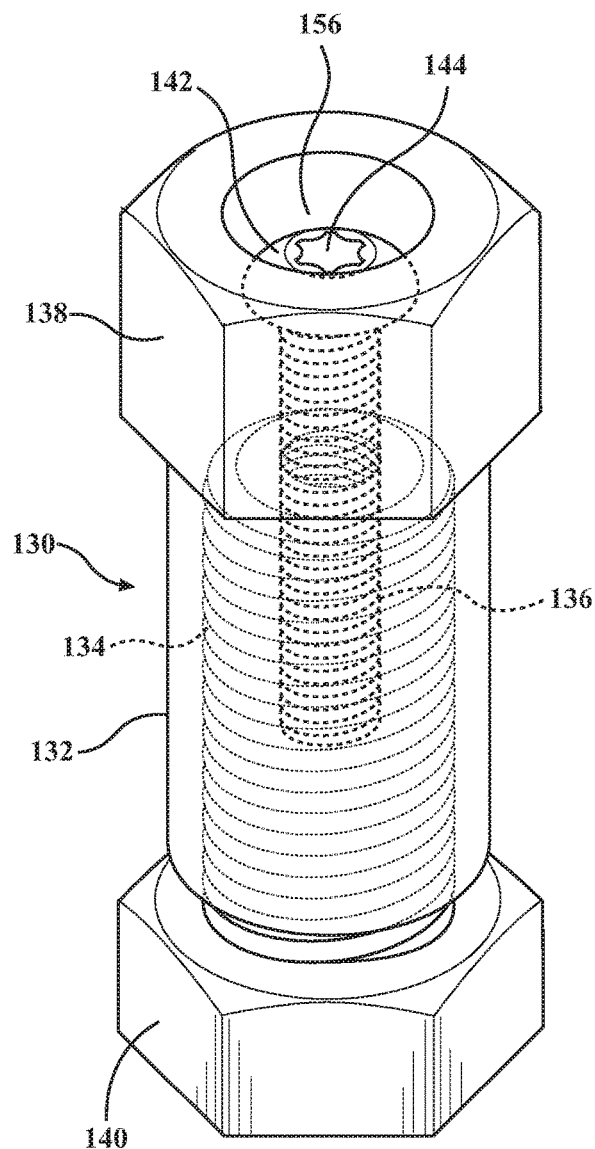
FIG. 22 is an assembled and partially transparent view of a three piece fastener according to a further embodiment of the present invention.
Figure 23:
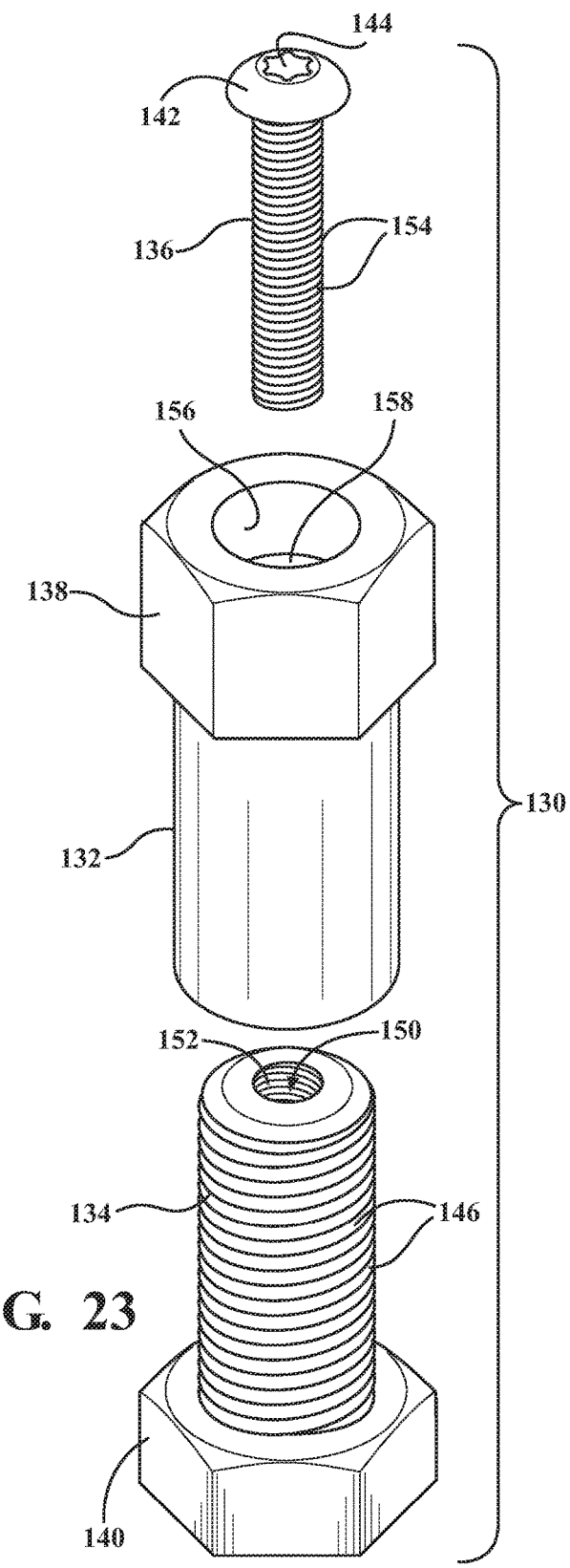
FIG. 23 is an exploded view depicting the three piece fastener of FIG. 22.

Referring now to FIG. 22, an assembled and partially transparent view is generally shown at 130 of a three-piece fastener according to a further embodiment of the present invention. As additionally shown in the exploding and axial cutaway views in succeeding FIGS. 23-25, the three-piece fastener includes intermediate component 132 and first (bottom) hollow screw 134 and second (top) solid screw 136.

As with the preceding variant, the intermediate component 132 and first 134 and second 136 fasteners can be constructed of any rigid material not limited to steel, carbon steel or any durable composite (e.g. nylon or polymer) material. As further understood, the screws 134 and 136 are also commonly termed as "threaded bolts" however can include any other suitable configuration for inter-engaging with the intermediate component 132 in the manner described herein.

Figure 24:
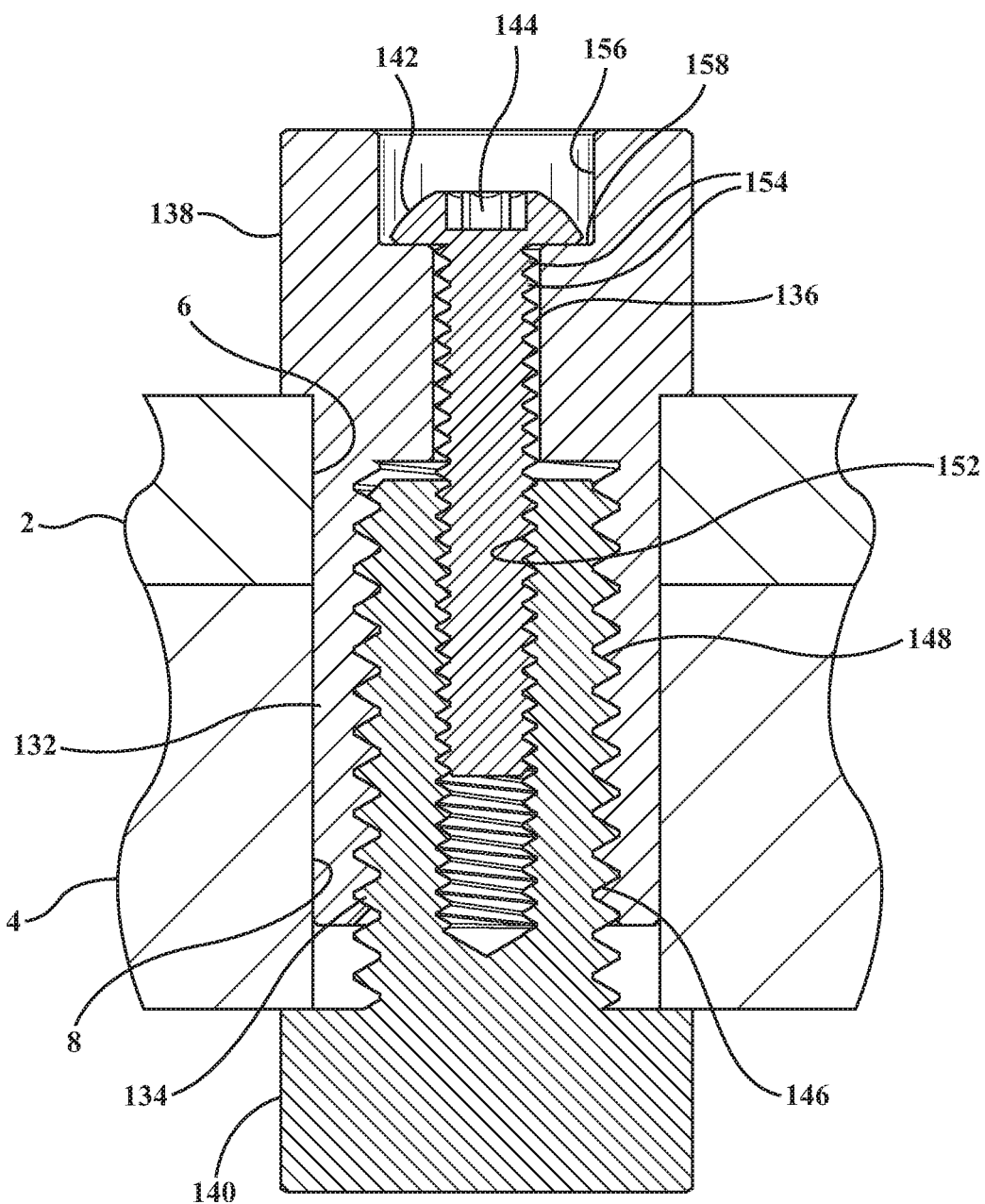
FIG. 24 is an axial cutaway view depicting the assembly of FIG. 22.
Figure 25:
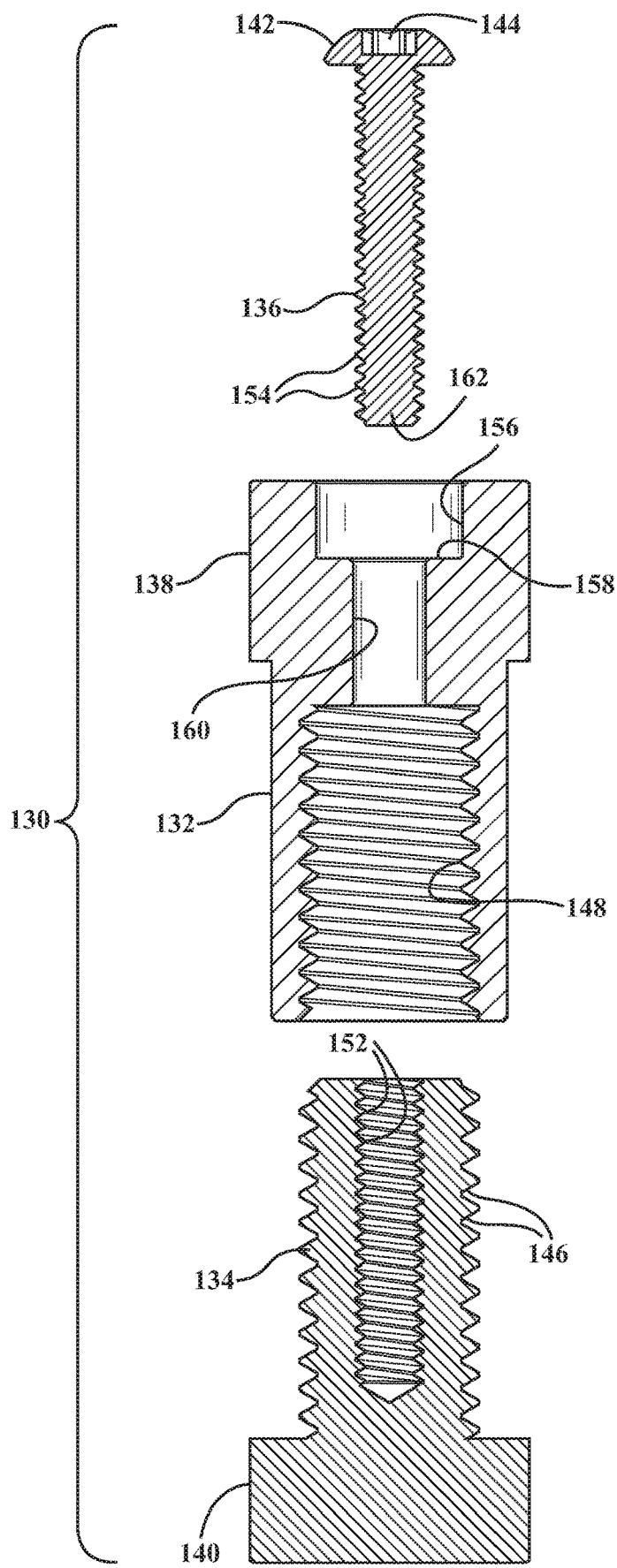
FIG. 25 is an axial cutaway of the exploded view of FIG. 23.

FIG. 24 provides an axial cutaway view depicting the assembly of FIG. 22 and further showing the first 2 and second 4 layers (see also FIG. 4) being secured together, each having aligning apertures again depicted by inner perimeter surfaces 6 and 8, respectively, and through which the stem portion (again at 132) of the intermediate component extends. FIG. 25 further provides is an exploded axial cutaway view corresponding to FIG. 23 of the three-piece fastener 130.

As previously described, the layers 2 and 4 are generally represented and can include any configuration or application not limited in one potential application to such as an attachment fastener for a skate blade to a flange, bracket or other support surface. As also previously described, and in a further application, the layers 2 and 4 can correspond to an inner rim or wheel supporting a tire in attachment to a wheel hub such that the present invention serves to provide a durable fastener arrangement which resists loosening in response to vibrations and the like, such as which can be typical of dynamic operating environments.

The intermediate component 132 includes an enlarged polygonal shaped head, such as which is depicted as a hex head configuration at 138, which is shown proximate its upper open end. At least one of the selected screws 134/136 (also again termed bolt threads) likewise include an enlarged hex head which is depicted in FIG. 22 by hex head 140 associated with the lower or first bolt 134. As further again shown in FIG. 24, the opposing inner ledge surfaces created by the enlarged hex heads 138 and 140 provide the sandwiching force to the proximate aperture surface perimeter locations of the layers 2/4 in the environmental illustration shown. Without limitation, the hex head can again be substituted by any other multi-sided polygonal shape head, not limited to any of a triangular, square, pentagonal or other shape exhibiting a number of interconnected sides, and it is also again envisioned that the polygonal shaped enlarged heads can be reconfigured in other shapes consistent with the use of any tightening or loosening tool.

The upper or second screw 136 includes a curved and enlarged diameter head 142. A tool bit engageable recess (see as including a star profile 144 also known as a Torx style screw by non-limiting example) is formed in the enlarged head 142 to facilitate engagement by a tool bit (not shown) for securing the second (top) screw 136 following pre-threaded engagement of the exterior threads (at 146) of the lower screw 134 within the interior threads (best shown at 148 in FIG. 25) of the intermediate component 132.

As further shown, the first screw 132 includes a hollow shaft (see generally at 150 in FIG. 23) exhibiting a further plurality of interior threads (further at 152) matching a direction of the first thread pattern 146. In comparison, the second screw 136 exhibits a second exterior thread pattern 154 which is opposite the first pattern and, upon being installed within the other selected one of the opposite ends (depicted as the upper end of the intermediate component 132), results in rotationally inter-engaging of the thread pattern 154 with the opposing interior thread pattern 152 of the first screw 134, with loosening of either of the first 134 and second 136 screws being prevented by virtue of their counter-threaded orientation.

Additional features include the intermediate component 132 exhibiting an upper end proximate undercut recess, see annular inner rim surface 156 communicated with undercut ledge 158, this for receiving and seating the enlarged head 142 of the second fastener 136 in the shown in FIGS. 22 and 24. A circular inner perimeter (see at 160) is configured in the undercut recess for communicating the solid extending stem (at 162) of the second fastener 136 within the open interior of the intermediate component 132 and into engagement with the hollow threaded interior 150 of the previously installed first fastener 134 according to the previously described counter-threaded and loosening preventative manner.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A three-piece locking fastener, comprising:
   an intermediate component having a one piece body with a smooth exterior surface and an enlarged diameter defined by a multi-sided polygonal configuration, a first hollowed interior extending between opposite ends, said intermediate component including a plurality of interior threads arrayed in a first direction and extending from a first of said opposite ends, a smooth walled recess defined within said multi-sided polygonal configuration and extending inwardly from the other of said opposite ends and terminating in an undercut ledge;
   a first fastener having a further one piece body with a first enlarged head and a first stem with a second hollowed interior, a first exterior thread pattern configured on said first stem extending in the first direction for rotationally inter-engaging with said interior threads of said intermediate component when installed through said first selected one of said opposite ends, said second hollowed interior of said first fastener exhibiting a further plurality of interior threads extending in a second direction that is opposite to the first direction; and
   a second fastener having a second enlarged head and a second stem, upon which is configured a second exterior thread pattern extending in the second direction and, upon being installed through said multi-sided polygonal configuration and within the other selected one of said opposite ends of said intermediate component, said second enlarged head being received within said smooth walled recess and against said undercut ledge so that said second enlarged head does not project axially beyond a perimeter edge of the recess, said second fastener rotationally inter-engaging said interior threads of said first fastener in the second direction, with loosening of either of said first and second fasteners being prevented.

2. The locking fastener of claim 1, said enlarged head of said first fastener further comprising a number of interconnected sides having a polygonal shape.

3. The locking fastener of claim 2, said second enlarged head of said second fastener further comprising a curved and enlarged diameter head.

4. The locking fastener of claim 3, further comprising a tool bit engageable recess profile incorporated into said second enlarged head of said second fastener.

5. The locking fastener of claim 1, further comprising a polygonal inner perimeter configured in said undercut recess for communicating said second stem of said second fastener within said intermediate component and in engagement with said hollow threaded interior of said previously installed first fastener.

6. The locking fastener of claim 1, said intermediate component and said first and second fasteners each further comprising a rigid material.

7. The locking fastener of claim 2, further comprising first and second layers having aligning apertures through which said intermediate component extends, said multi-sided polygonal configuration of said intermediate component along with said first enlarged head of said first fastener, compressing against opposite edge surfaces of said layers adjoining said apertures.

8. The locking fastener of claim 1, further comprising a circular inner perimeter configured in said undercut recess for communicating said second stem of said second fastener within said intermediate component and in engagement with said hollow threaded interior of said previously installed first fastener.

9. The locking fastener of claim 1, said enlarged diameter defined by said multi-sided polygonal configuration of said intermediate component and said first enlarged head of said first fastener further comprising opposite end surfaces of said fastener, each further including a flattened profile.

10. The locking fastener of claim 1, said enlarged diameter defined by said multi-sided polygonal configuration of said intermediate component further comprising a hex head.

* * * * *